(12) United States Patent
Mizobe et al.

(10) Patent No.: US 12,275,150 B2
(45) Date of Patent: Apr. 15, 2025

(54) METHOD OF SETTING CONTROL PARAMETER OF ROBOT, ROBOT SYSTEM, AND COMPUTER PROGRAM

(71) Applicant: SEIKO EPSON CORPORATION, Tokyo (JP)

(72) Inventors: Kimitake Mizobe, Nagaokakyo (JP); Jun Toda, Shiojiri (JP); Shota Morozumi, Shiojiri (JP); Ryutaro Seki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 200 days.

(21) Appl. No.: 17/856,196

(22) Filed: Jul. 1, 2022

(65) Prior Publication Data

US 2023/0001578 A1  Jan. 5, 2023

(30) Foreign Application Priority Data

Jul. 2, 2021 (JP) .................................. 2021-110694

(51) Int. Cl.
*B25J 9/16* (2006.01)

(52) U.S. Cl.
CPC ............. *B25J 9/1653* (2013.01); *B25J 9/161* (2013.01); *B25J 9/1633* (2013.01); *B25J 9/1664* (2013.01)

(58) Field of Classification Search
CPC ........ B25J 9/1653; B25J 9/161; B25J 9/1633; B25J 9/1664; G05B 19/4083
See application file for complete search history.

(56) References Cited

U.S. PATENT DOCUMENTS

2020/0005499 A1   1/2020  Tsuneki et al.

FOREIGN PATENT DOCUMENTS

JP   2020-004080 A   1/2020

OTHER PUBLICATIONS

Rostami et al., "Progressive Preference Articulation for Decision Making in Multi-Objective Optimisation Problems," Jul. 2017, Integrated Computer Aided Engineering 24, (Year: 2017).*
Dos Santos, et al., "Design of a linear time-invariant control system based on a multiobjective optimization approach," Jun. 2015, Computational and Applied Mathematics (Year: 2015).*

* cited by examiner

*Primary Examiner* — Spencer D Patton
(74) *Attorney, Agent, or Firm* — Harness, Dickey & Pierce, P.L.C.

(57) ABSTRACT

A method of the present disclosure includes (a) receiving settings of an objective function and a constraint condition, (b) controlling a robot to execute work using a candidate value of a control parameter and measuring a performance index value for the objective function and a constraint evaluation value, (c) searching for a next candidate value of the control parameter by executing optimization processing using a value of the objective function, (d) obtaining the values of the objective function and the constraint evaluation values with respect to the plurality of candidate values by repeating (b) and (c), and (e) displaying a processing result containing a correlation chart showing the values of the objective function and the constraint evaluation values with respect to each of the plurality of candidate values.

3 Claims, 13 Drawing Sheets

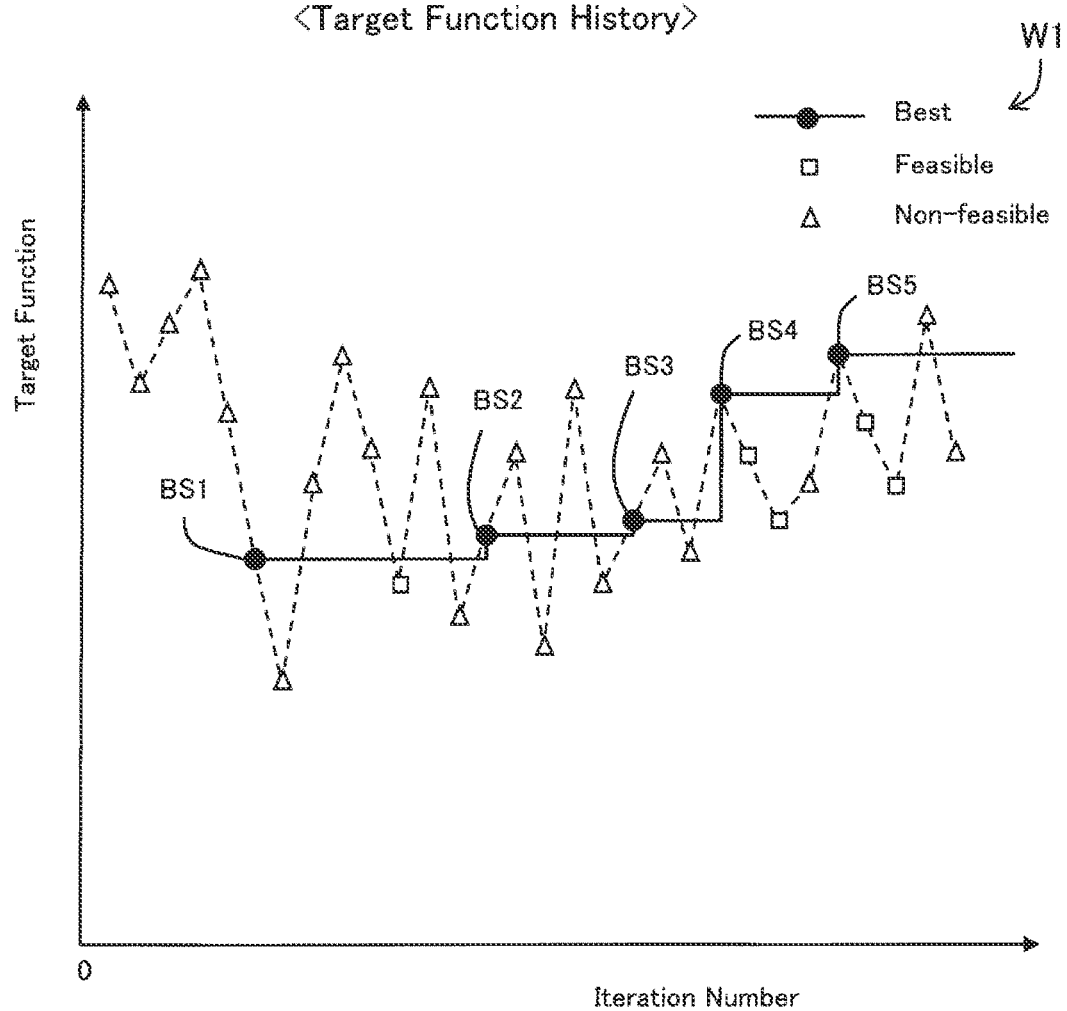

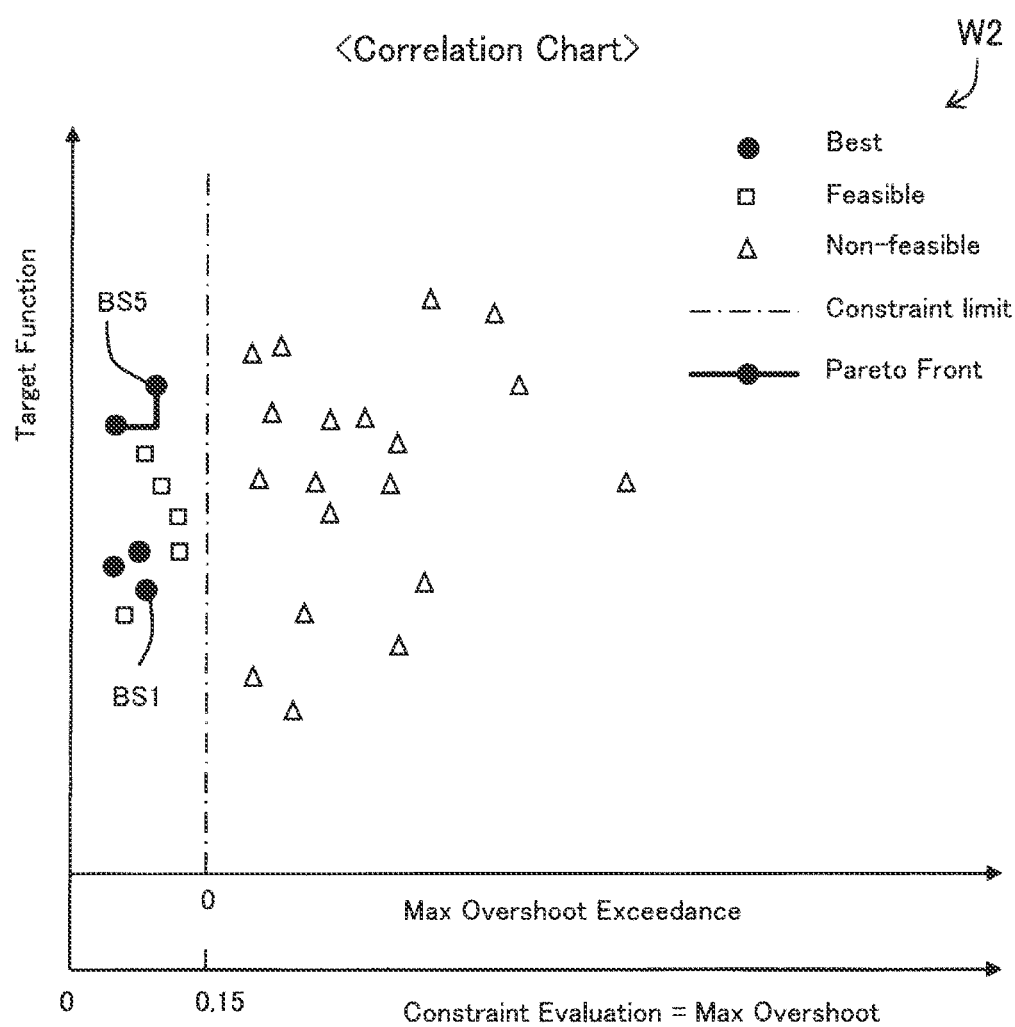

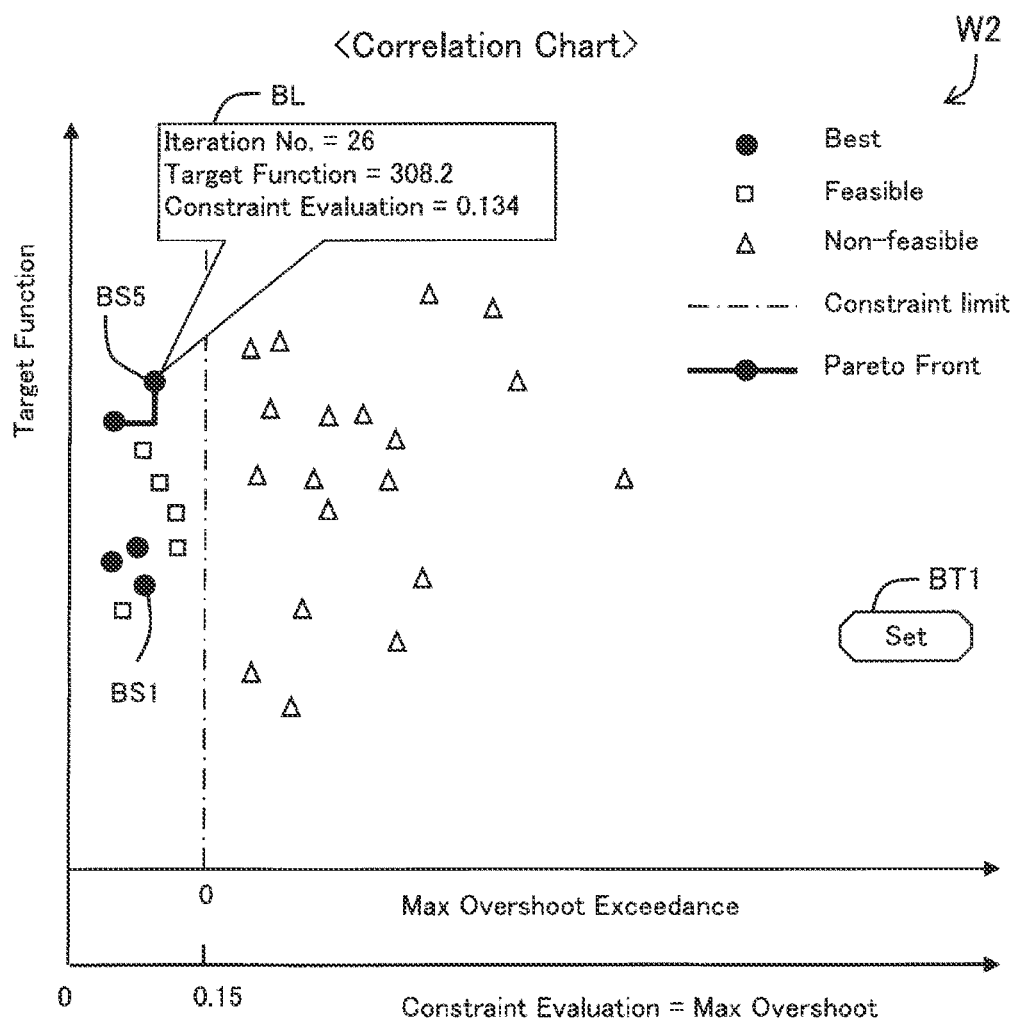

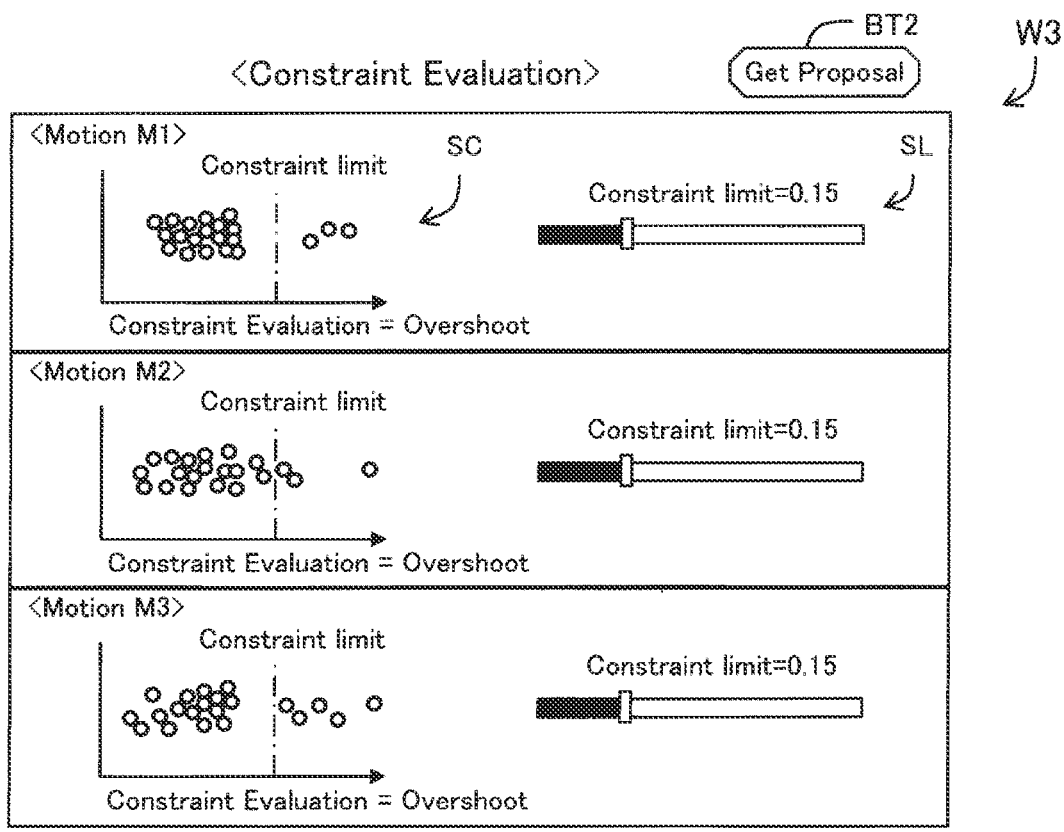

METHOD OF SETTING CONTROL PARAMETER OF ROBOT, ROBOT SYSTEM, AND COMPUTER PROGRAM

The present application is based on, and claims priority from JP Application Serial Number 2021-110694, filed Jul. 2, 2021, the disclosure of which is hereby incorporated by reference herein in its entirety.

BACKGROUND

1. Technical Field

The present disclosure relates to a method of setting a control parameter of a robot, a robot system, and a computer program.

2. Related Art

JP-A-2020-4080 discloses a machine learning apparatus that performs machine learning and setting a control parameter for a servo control apparatus controlling a servo motor. The machine learning apparatus acquires a plurality of evaluation function values calculated using servo data and outputs the acquired plurality of evaluation function values. The control parameter is set according to these plurality of evaluation function values.

However, operations and details of control of a robot are more complex than those of the servo motor, and there is a problem that it is difficult to appropriately set a control parameter of the robot.

SUMMARY

According to a first aspect of the present disclosure, a method of setting a control parameter of a robot is provided. The method includes (a) receiving settings of an objective function and a constraint condition used for optimization processing of the control parameter, (b) controlling the robot to execute work using a candidate value of the control parameter and measuring a performance index value for obtainment of the objective function and a constraint evaluation value relating to the constraint condition during the work, (c) searching for a next candidate value of the control parameter by executing the optimization processing using a value of the objective function obtained from the performance index value, (d) obtaining the values of the objective function and the constraint evaluation values with respect to the plurality of candidate values by repeating (b) and (c), and (e) displaying a processing result containing a correlation chart showing the values of the objective function and the constraint evaluation values with respect to each of the plurality of candidate values.

According to a second aspect of the present disclosure, a robot system is provided. The robot system includes a robot, sensors detecting a specific performance index value and a specific constraint evaluation value in work by control of the robot, and a parameter setting section executing processing of setting a control parameter of the robot. The parameter setting section executes (a) processing of receiving settings of an objective function and a constraint condition used for optimization processing of the control parameter, (b) processing of controlling the robot to execute work using a candidate value of the control parameter and measuring the performance index value for obtainment of the objective function and the constraint evaluation value relating to the constraint condition during the work, (c) processing of searching for a next candidate value of the control parameter by executing the optimization processing using a value of the objective function obtained from the performance index value, (d) processing of obtaining the values of the objective function and the constraint evaluation values with respect to the plurality of candidate values by repeating the processing (b) and the processing (c), and (e) processing of displaying a processing result containing a correlation chart showing the values of the objective function and the constraint evaluation values with respect to each of the plurality of candidate values.

According to a third aspect of the present disclosure, a non-transitory computer-readable storage medium storing a computer program for controlling a processor to execute processing of setting a control parameter of a robot is provided. The non-transitory computer-readable storage medium stores the computer program controlling the processor to execute (a) processing of receiving settings of an objective function and a constraint condition used for optimization processing of the control parameter, (b) processing of controlling the robot to execute work using a candidate value of the control parameter and measuring a performance index value for obtainment of the objective function and a constraint evaluation value relating to the constraint condition during the work, (c) processing of searching for a next candidate value of the control parameter by executing the optimization processing using a value of the objective function obtained from the performance index value, (d) processing of obtaining the values of the objective function and the constraint evaluation values with respect to the plurality of candidate values by repeating the processing (b) and the processing (c), and (e) processing of displaying a processing result containing a correlation chart showing the values of the objective function and the constraint evaluation values with respect to each of the plurality of candidate values.

BRIEF DESCRIPTION OF THE DRAWINGS

FIG. 6 is an explanatory diagram showing a display example of a history of an objective function.

FIG. 7 is an explanatory diagram showing a display example of a correlation chart on the objective function and a constraint condition.

FIG. 8 is an explanatory diagram showing a display example of a result of an optimal solution.

FIG. 9 is an explanatory diagram showing a display example of constraint evaluation values.

FIG. 10 is an explanatory diagram showing a display example of an iteration results list.

DESCRIPTION OF EXEMPLARY EMBODIMENTS

Figure 1:
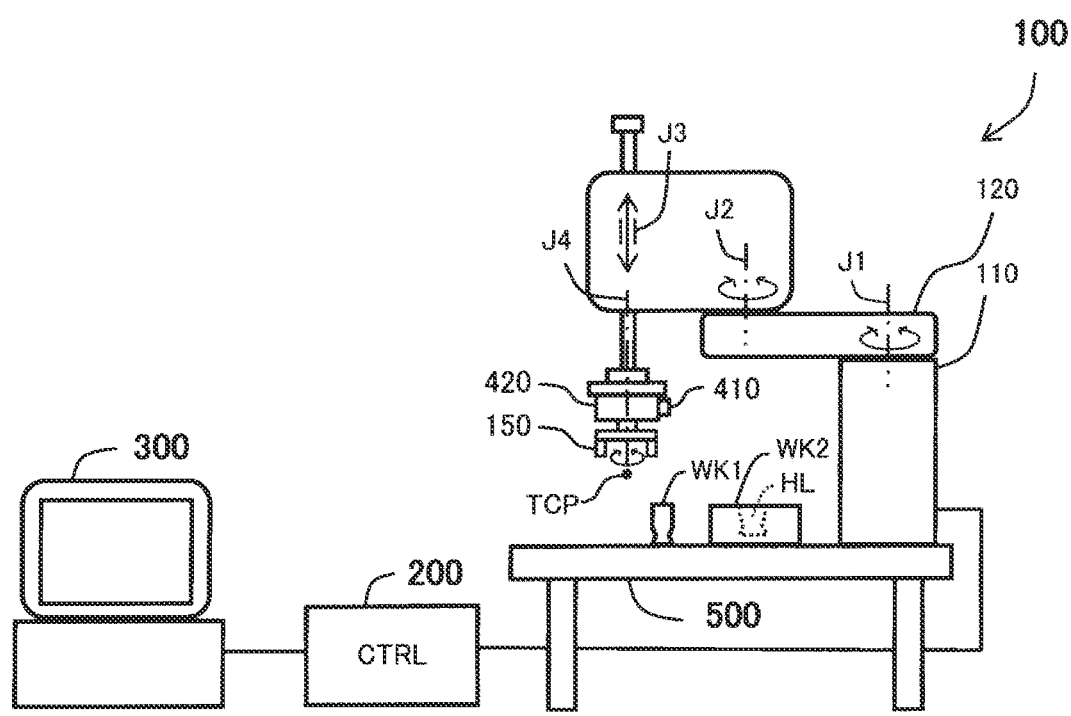
FIG. 1 is an explanatory diagram showing a configuration of a robot system in an embodiment.

FIG. 1 is an explanatory diagram showing an example of a robot control system in an embodiment. The robot control system includes a robot 100, a control apparatus 200 controlling the robot 100, and an information processing apparatus 300. The robot 100 is installed on a platform 500. The information processing apparatus 300 is e.g. a personal computer.

The robot 100 includes a base 110 and a robot arm 120. An end effector 150 is attached to the distal end portion of the robot arm 120. Further, a vibration sensor 410 and a force sensor 420 are provided in the hand of the robot arm 120. In the present disclosure, "the hand of the robot arm 120" refers to a portion from the distal end of the robot arm 120 to the end effector 150.

The robot arm 120 is sequentially coupled by four joints J1 to J4. "Joint" is also referred to as "axis". A TCP (Tool Center Point) as a control point of the robot 100 is set near the distal end portion of the robot arm 120. "Control point" is a point as a reference for control of the robot arm 120. The TCP can be set in an arbitrary position. The control of the robot 100 refers to control of a position and an attitude of the TCP. In the embodiment, a four-axis robot having the robot arm 120 with the four joints J1 to J4 is exemplified, however, a robot having any arm mechanism with one or more joints can be used. The robot 100 of the embodiment is a horizontal articulated robot, however, a vertical articulated robot may be used.

The vibration sensor 410 is a sensor that can detect vibration of the robot 100. Generally, the vibration may be detected by measurements of temporal changes of one of a position, a velocity, and an acceleration. As the vibration sensor 410, e.g. a position sensor, a gyro sensor, an acceleration sensor, an inertial measurement unit, or the like may be used. Note that the vibration sensor 410 may be provided in another position than the hand of the robot arm 120. For example, when the vibration of the platform 500 is a constraint condition for the optimization processing, a vibration sensor may be provided in the platform 500. When the vibration is not a constraint condition, the vibration sensor 410 can be omitted.

The force sensor 420 is a sensor detecting a force applied to the end effector 150. As the force sensor 420, a load cell that can detect a force in a single axial direction and a force sensor and a torque sensor that can detect force components in a plurality of axial directions can be used. In the embodiment, a six-axis force sensor is used as the force sensor 420. The six-axis force sensor detects magnitude of forces parallel to three detection axes orthogonal to one another and magnitude of torque around the three detection axes in an intrinsic sensor coordinate system. Note that the force sensor 420 may be provided in another position than the hand of the robot arm 120, e.g. one or more joints of the joints J1 to J4.

In the embodiment, the robot 100 fits a first workpiece WK1 into a hole HL of a second workpiece WK2, and thereby, executes work to assemble the two workpieces WK1, WK2. In the work, force control using a force detected by the force sensor 420 is executed. Note that, when the force control is not used, the force sensor 420 can be omitted.

Figure 2:
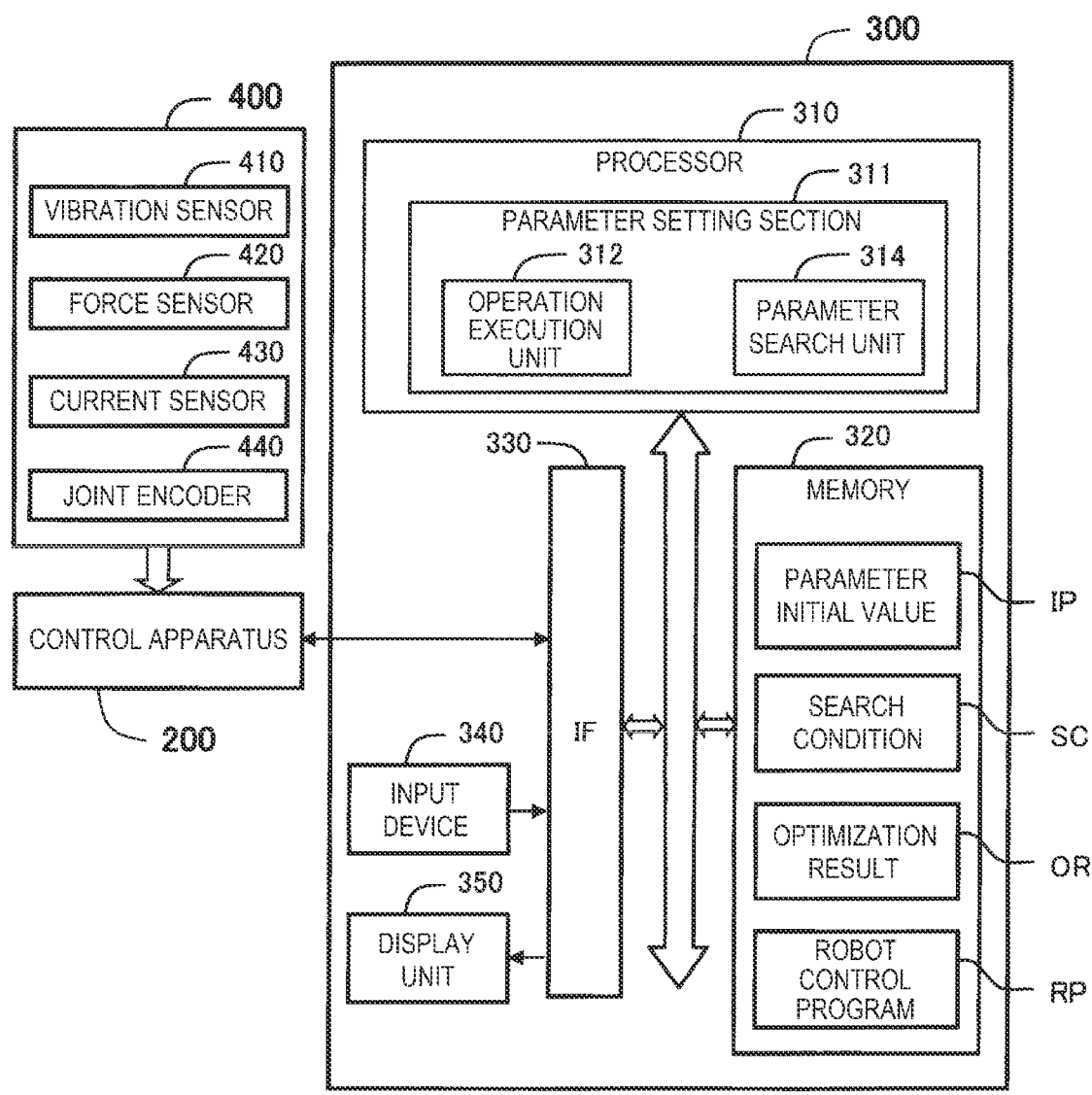
FIG. 2 is a functional block diagram of an information processing apparatus in the embodiment.

FIG. 2 is a block diagram showing functions of the information processing apparatus 300. The information processing apparatus 300 has a processor 310, a memory 320, an interface circuit 330, and an input device 340 and a display unit 350 coupled to the interface circuit 330. The control apparatus 200 is further coupled to the interface circuit 330. Measurement results of sensors 400 of the robot 100 are supplied to the information processing apparatus 300 via the control apparatus 200.

The sensors 400 include a current sensor 430 measuring currents of motors provided in the respective joints of the robot 100 and a joint encoder 440 detecting motion positions of the respective joints in addition to the vibration sensor 410 and the force sensor 420 explained in FIG. 1. At least part of the sensors 400 is used for obtainment of a performance index value and a constraint evaluation value used for optimization processing of a motion parameter, which will be described later.

The processor 310 has a function as a parameter setting section 311 setting a control parameter of the robot 100. The parameter setting section 311 includes functions of an operation execution unit 312 and a parameter search unit 314. The operation execution unit 312 controls the robot 100 to execute work according to a robot control program. The parameter search unit 314 executes processing of searching for the control parameter of the robot 100. The function of the parameter setting section 311 is realized by the processor 310 executing a computer program stored in the memory 320. Note that part or all of the functions of the parameter setting section 311 may be realized by a hardware circuit.

In the memory 320, a parameter initial value IP, a search condition SC, an optimization result OR, and a robot control program RP are stored. The parameter initial value IP is an initial value of the control parameter. The search condition SC is a condition for searching of the control parameter in the optimization processing. The optimization result OR is a result of the optimization processing of the control parameter. The robot control program RP includes a plurality of commands for moving the robot 100.

Figure 3:
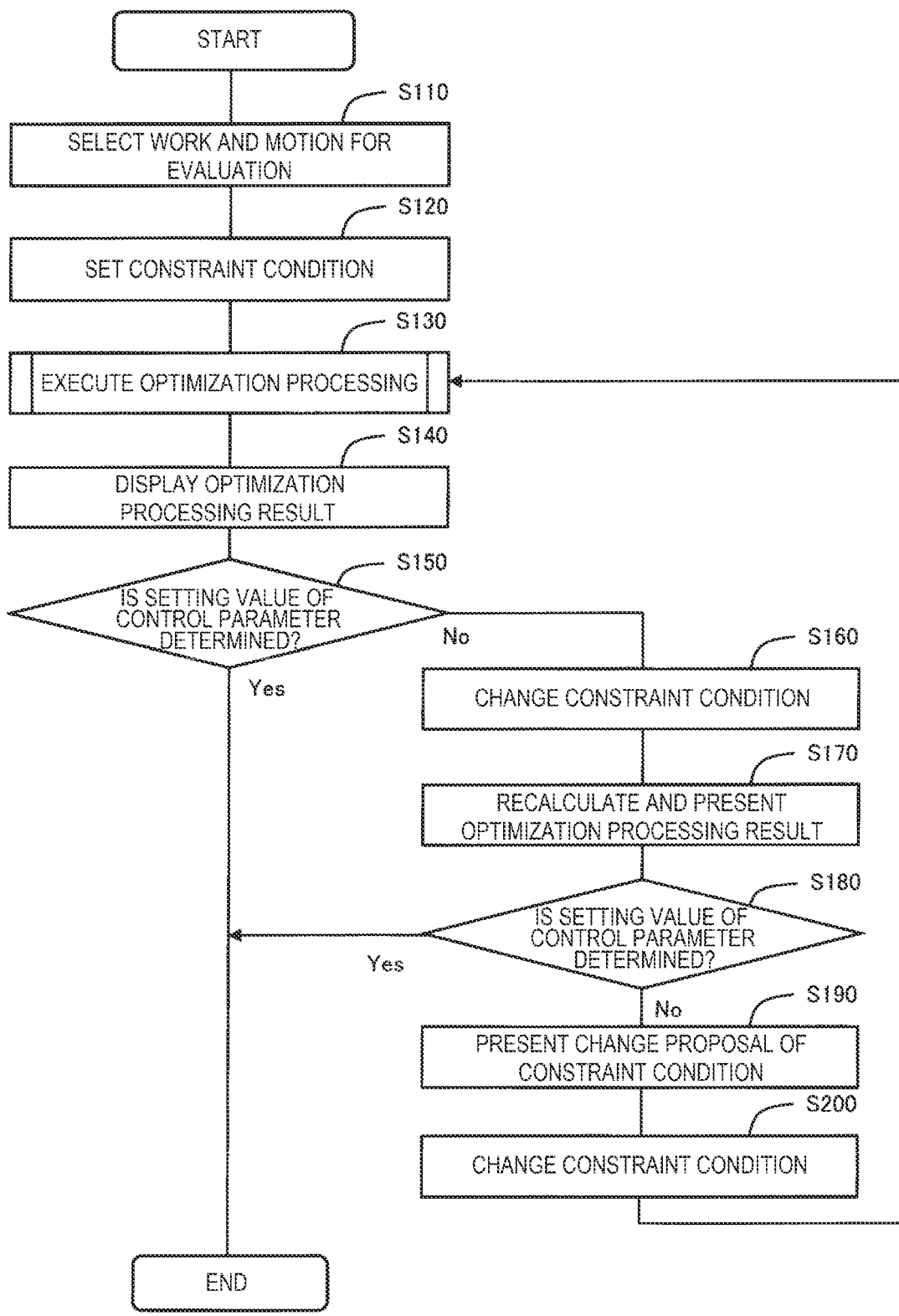
FIG. 3 is a flowchart showing a procedure of setting processing of a control parameter.

FIG. 3 is a flowchart showing a procedure of setting processing of the control parameter. At step S110, a worker selects work for which the control parameter is set and a motion for evaluation, and the parameter search unit 314 receives the selection. In the embodiment, fitting work of two workpieces WK1, WK2 shown in FIG. 1 is selected. The robot control program RP is a program in which the motion of the work is described.

The motion for evaluation refers to a motion as an object for which an objective function and a constraint condition of the optimization processing are evaluated. In the embodiment, for example, the following five motions are used as the motions for evaluation:

(1) Motion M1: move the end effector 150 to above the first workpiece WK1, and then, move the end effector downward to the position of the first workpiece WK1, (2) Motion M2: grip the first workpiece WK1 by the end effector 150, (3) Motion M3: move the gripped first workpiece WK1 upward, move the first workpiece horizontally to above the second workpiece WK2, and then, move the first workpiece downward immediately above the second workpiece WK2, (4) Motion M4: fit the first workpiece WK1 in the second workpiece WK2, and (5) Motion M5: release the first workpiece WK1 and move the end effector 150 to above.

As the motions for evaluation, motions formed by further division into smaller pieces than these examples may be used. For example, in the motion M3, when an arch motion of rotating the hand to 90 degrees is made in the movement, the motion M3 is divided into three pieces of a motion in the upward movement, a motion in the horizontal movement, and a motion in the downward movement, and thereby, performance index values and characteristic values in the respective motions can be respectively evaluated. Note that the entire work is not divided into a plurality of motions for evaluation, but only an objective function and a constraint condition for the entire work may be used.

At step S120, the worker sets a search condition in the optimization processing of the control parameter and the parameter search unit 314 receives the setting. As the search condition, an objective function, a constraint condition, a search range for the control parameter, and an initial value of the control parameter are set.

Objective Function

In the embodiment, as an objective function y, an average velocity of a plurality of motions for evaluation given by the following expression is used.

$$y=(d_1/t_1+d_2/t_2+ \ldots +d_N/t_N)N \quad (E1)$$

Here, $d_i$ is a movement distance of the control point TCP in the ith motion for evaluation, $t_i$ is time required for the ith motion for evaluation, and N is a number of the motions for evaluation. N is an integer number equal to or larger than 1.

It is preferable that the objective function is larger. In the optimization processing, a candidate value of the control parameter is searched for to increase the objective function y. Note that, as an index value of the objective function, any other index value than the above described average velocity can be used and, for example, a takt time of work may be used as the index value of the objective function. When the takt time is used as the objective function, it is preferable that the objective function is smaller and a candidate value of the control parameter is searched for to decrease the objective function.

Constraint Condition

As the constraint condition, for example, a condition on one or more of the following various constraint evaluation values (Constraint Evaluations) may be used:

(1) Overshoot Amount: an overshoot amount of a position when a target position is reached. The overshoot amount is calculated from the measurement results of the vibration sensor 410 and the joint encoder 440, (2) Peak Torque: peak torque of the motors of the respective axes of the robot arm 120. The peak torque is calculated from the measurement result of the current sensor 430, (3) Maximum Resultant Force: the maximum value of a resultant force of forces in the three axial directions measured by the force sensor 420, and (4) Life Prediction Value of Reducer: prediction values of lives of reducers provided in the respective axes of the robot arm 120. The prediction values are calculated from the measurement results of the vibration sensor 410 and the joint encoder 440.

In the embodiment, mainly, a case where the overshoot amount is used as the constraint evaluation value and an upper limit thereof is set as the constraint condition is assumed. Note that a constraint condition on one or more constraint evaluation values may be set. In the present disclosure, "constraint evaluation value" is a specific performance index value as an object of the constraint condition and refers to a value obtained from the measurement results of the sensors 400. The constraint condition is set by a type of the constraint evaluation value and an upper limit or a lower limit of the constraint evaluation value.

Control Parameter and Search Range and Initial Value Thereof

In the optimization processing, for example, one or more of the following control parameters may be set as objects for searching.

(1) Max accelerations of the respective axes of the robot arm 120, (2) Max decelerations of the respective axes of the robot arm 120, and (3) coefficients of a virtual mass coefficient, a virtual viscosity coefficient, and a virtual elastic coefficient in force control.

In the embodiment, a case where the maximum accelerations and the maximum decelerations of the respective axes are objects for optimization processing is assumed. The empirically determined search range and initial value of the control parameter are used.

At step S130, the parameter search unit 314 executes the optimization processing of the control parameter according to the set search condition.

Figure 4:
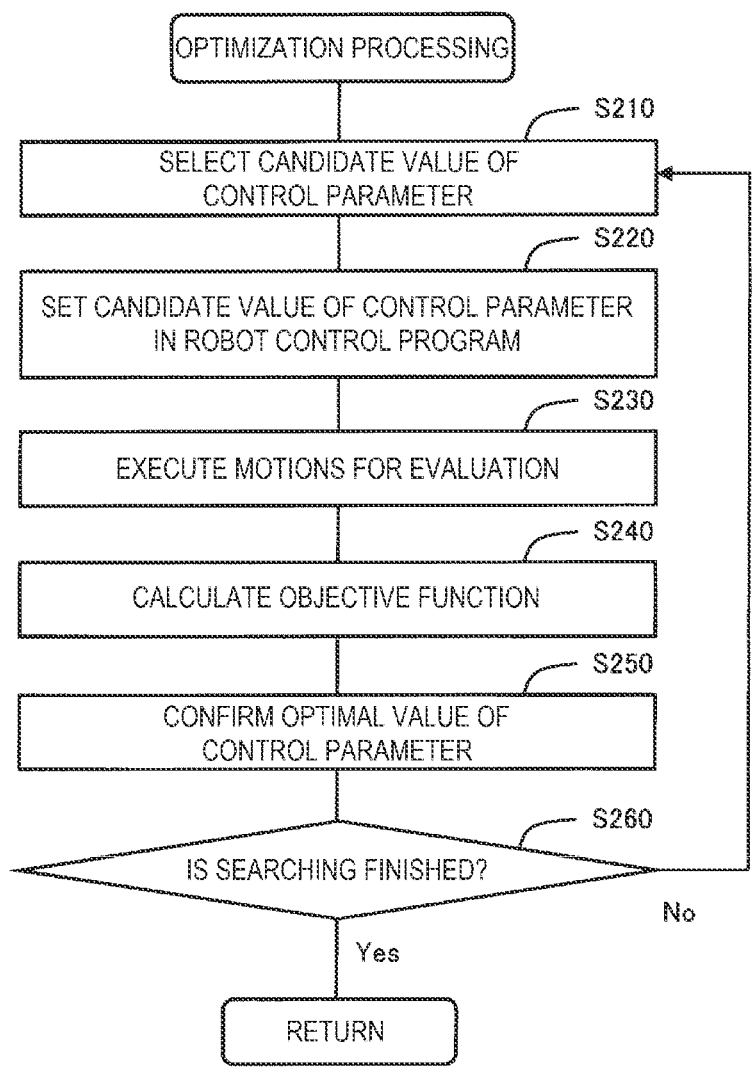
FIG. 4 is a flowchart showing a detailed procedure of optimization processing.

FIG. 4 is a flowchart showing a detailed procedure of optimization processing at step S130. At step S210, the parameter search unit 314 searches for a candidate value of the control parameter. The searching is executed using an optimization algorithm e.g. CMA-ES (Covariance Matrix Adaptation Evaluation Strategy). Note that, when step S210 is first executed, an initial value set at step S120 is used as the candidate value of the control parameter.

At step S220, the parameter search unit 314 sets the candidate value of the control parameter selected at step S210 in the robot control program RP. At step S230, the operation execution unit 312 performs work including the above described plurality of motions for evaluation M1 to M5 according to the robot control program RP. During these motions, the measurement values of the sensors 400 are acquired. Further, the constraint evaluation value as an object of the constraint condition is calculated. In the embodiment, the overshoot amount is obtained as the constraint evaluation value.

At step S240, the parameter search unit 314 calculates a value of the above described objective function y from the measurement result obtained at step S230. At step S250, the parameter search unit 314 confirms the optimal value of the control parameter according to the constraint evaluation value and the value of the objective function y. That is, when the constraint evaluation value satisfies the constraint condition and the value of the objective function y is the best value, i.e., the maximum value of the previous values, the candidate value at the present time is updated as a new optimal value. On the other hand, when the constraint evaluation value does not satisfy the constraint condition or the value of the objective function y is not the best value of the previous values, the previous optimal value is maintained without change.

At step S260, the parameter search unit 314 determines whether or not a search end condition is fulfilled. As the search end condition, a condition that both a first condition that the constraint condition is satisfied and a second condition that the objective function y reaches a preset target value are fulfilled may be used. Or, not both the first condition and the second condition are fulfilled, but the number of searches reaches a preset upper limit, the search end condition may be regarded as being fulfilled. When the search end condition is not fulfilled, the process returns to step S210 and the above described processing is executed again. On the other hand, when the search end condition is fulfilled, the optimization processing in FIG. 4 ends.

The single search processing at steps S210 to S250 in FIG. 4 is referred to as "iteration". Normally, many iterations are executed until the search end condition is fulfilled. The single iteration is correlated with a single candidate value of the control parameter. Accordingly, in the following explanation, the term "iteration" and the term "candidate value of control parameter" or "solution" are used substantially in the same meaning.

The optimization processing ends as described above, and then, the process goes to step S140 in FIG. 3. At step S140, the parameter search unit 314 displays and presents a processing result of the optimization processing on the display unit 350 to the worker.

Figure 5:
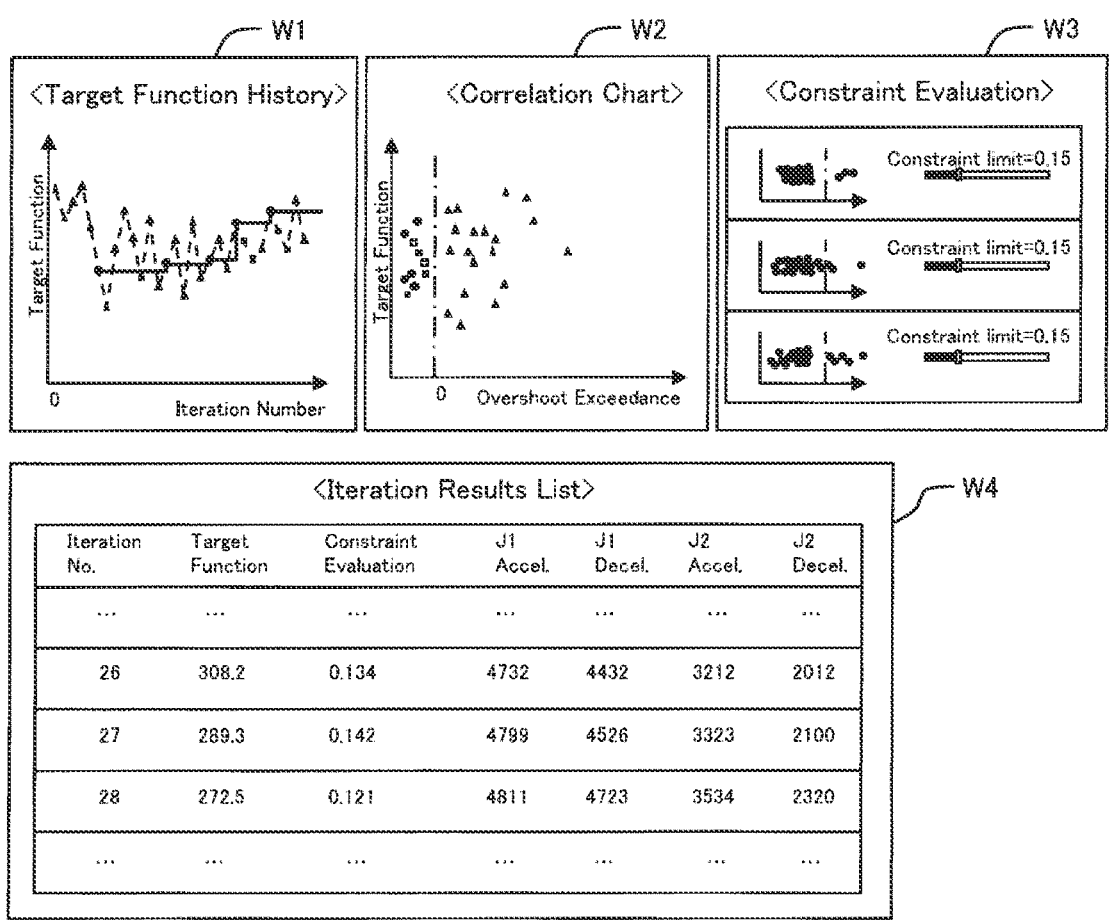
FIG. 5 is an explanatory diagram showing a display example of a processing result of the optimization processing.

FIG. 5 is an explanatory diagram showing a display example of the processing result of the optimization processing. FIG. 5 shows the following windows W1 to W4 in graphical representation:
(1) a first window W1 showing a history of the objective function,
(2) a second window W2 showing a correlation chart of the objective function and the constraint condition,
(3) a third window W3 showing a graph of the constraint evaluation values and limit values, and
(4) a fourth window W4 showing an iteration results list.

The details of these four windows W1 to W4 are respectively as follows.

FIG. 6 is an explanatory diagram showing a display example of the history of the objective function displayed in the first window W1. The horizontal axis of FIG. 6 indicates the ordinal number of the iteration and the vertical axis indicates the value of the objective function. In FIG. 6, the values of the objective function obtained in the respective iterations are distinguished in the following three types of solutions and plotted:
(1) Optimal Solution (Best): the iteration satisfying the constraint condition and providing the best objective function of the previous iterations. In the embodiment, the average velocity given by the above described expression (E1) is used as the objective function, and "the objective function is the best" means that the objective function is the maximum value,
(2) Feasible Solution (Feasible): the iteration satisfying the constraint condition, but not providing the best objective function of the previous iterations, and
(3) Non-feasible Solution (Non-feasible): the iteration not satisfying the constraint condition.

In the example of FIG. 6, five best solutions BS1 to BS5 are displayed. The objective function of the best solutions gradually becomes better, and normally, the last best solution BS5 is the most preferable solution. Note that the other best solutions BS1 to BS4 and the feasible solutions can be employed and may be used as the final candidates. The worker can use the history diagram of the objective function as a criterion for determination as to whether or not a satisfactory solution is obtained.

FIG. 7 is an explanatory diagram showing a display example of the correlation chart on the objective function and the constraint condition shown in the second window W2 in FIG. 5. The horizontal axis of FIG. 7 indicates the maximum overshoot amount (Max Overshoot) as the constraint evaluation value or the maximum overshoot exceedance (Max Overshoot Exceedance) and the vertical axis indicates the value of the objective function.

The maximum overshoot amount MO and the maximum overshoot exceedance MOE are respectively calculated according to the following expressions.

$$MO=\max\{OS_i\} \tag{E2}$$

$$MOE=\max\{OS_i-Th_i\} \tag{E3}$$

Here, $OS_i$ is a measurement value of the overshoot amount in the ith motion for evaluation $M_i$, $Th_i$ is an upper limit of the overshoot amount in the ith motion for evaluation $M_i$, and max{ } is a calculation of taking the maximum value in the brackets. The maximum overshoot amount MO is the maximum value of the overshoot amounts $OS_i$ with respect to the plurality of motions for evaluation $M_i$. The maximum overshoot exceedance MOE is the maximum value of differences ($OS_i-Th_i$) between the overshoot amounts $OS_i$ with respect to the plurality of motions for evaluation $M_i$ and the upper limit $Th_i$.

A solution having the maximum overshoot exceedance MOE equal to or smaller than 0 satisfies the constraint condition and a solution having the maximum overshoot exceedance MOE larger than 0 does not satisfy the constraint condition. Note that, in FIG. 7, a case where the upper limit $Th_i$ of the overshoot amounts in the plurality of motions for evaluation $M_i$ is fixed is assumed and, in this case, both the horizontal axis of the maximum overshoot amount MO and the horizontal axis of the maximum overshoot exceedance MOE may be shown. As will be described later, the upper limit $Th_i$ of the overshoot amount in the individual motion for evaluation $M_i$ can be individually set. When the upper limit $Th_i$ is not fixed, as the horizontal axis of FIG. 7, only the maximum overshoot exceedance MOE is used.

Note that, when there are a plurality of constraint conditions, it is preferable to form the correlation chart so that the worker may select any one of the plurality of constraint conditions as the item of the horizontal axis of the correlation chart in FIG. 7. For the selection, e.g. a dropdown list can be used.

In the correlation chart in FIG. 7, a Pareto optimal curve (Pareto Front) is further drawn. The Pareto optimal curve is a curve showing a plurality of best solutions on the assumption that multi-objective optimization is performed with the objective function and the constraint evaluation value regarded as a kind of objective function. The worker may consider an appropriate solution with reference to the Pareto optimal curve. Note that the display of the Pareto optimal curve may be omitted.

In the correlation chart of FIG. 7, when the worker selects and click one point, the details of the processing result at the point are displayed on the screen.

FIG. 8 is an explanatory diagram showing an example of a processing result displayed when the worker selects the best solution BS5. In this example, when the worker selects the best solution BS5, the iteration number thereof, the value of the objective function, and the constraint evaluation value are displayed in a balloon BL or a small window. Therefore, the worker can individually confirm the objective functions and the constraint evaluation values in the individual solutions. Note that, when one point is selected in the window W2, it is preferable that the iteration result corresponding to the selected point is displayed in a form distinguishable from the other iteration results in the iteration result list displayed in the fourth window W4 in FIG. 5. As the distinguishable display form, e.g. highlight display, display in different character colors, or the like may be used.

FIG. 9 is an explanatory diagram showing a display example of graphs of constraint evaluation values and limit values displayed in the third window W3 in FIG. 5. Here, strip charts SC of the constraint evaluation values and sliders SL for setting the upper limits of the constraint evaluation values are shown with respect to the individual motions for evaluation M1, M2, . . . . The strip charts SC are graphs showing the histories of the overshoot amounts in the individual motions for evaluation M1, M2, . . . over all iterations. Note that the plotted points are slightly shifted upward and downward for understanding that there are many iteration histories. In the strip charts SC, lines indicating the upper limits of the constraint evaluation values are also displayed. Therefore, the worker may recognize the motions for evaluation in which the constraint evaluation values are close to or over the upper limits. The constraint evaluation values drawn in the strip charts SC are overshoot amounts in the individual motions for evaluation, and the upper limits are values set for the individual motions for evaluation. In the sliders SL, the values of the upper limits of the constraint evaluation values are displayed. The worker may individually set the upper limits of the constraint evaluation values for the individual motions for evaluation using the sliders SL.

Note that, in place of the strip charts SC, graphs in other forms such as violin plot may be used for displaying the histories of the constraint evaluation values in the individual motions for evaluation. Or, in place of the sliders SL, the upper limits of the constraint evaluation values may be set using other change operation portions such as entry fields. Or, the upper limits of the constraint evaluation values may not be individually set for the individual motions for evaluation, but the same value may be applied to all motions for evaluation. Here, the upper limits of the constraint evaluation values are individually set for the individual motions for evaluation, and thereby, a more appropriate control parameter may be obtained. Note that, as the constraint condition, a lower limit may be used in place of the upper limit. Generally, the constraint condition is specified by a limit value with respect to the constraint evaluation value, and the change operation portion is configured so that the worker may perform the operation to change the limit value with respect to the constraint evaluation value.

FIG. 10 is an explanatory diagram showing a display example of the iteration results list displayed in the fourth window W4 in FIG. 5. The iteration results list contains the iteration numbers, the values of the objective function, the constraint evaluation values, and the candidate values of the control parameters to be optimized. In FIG. 10, only the maximum accelerations and the maximum decelerations with respect to the J1 axis and the J2 axis are exemplified as the candidate values of the control parameter, however, normally, other candidate values of the control parameter are also displayed. The worker can confirm the details of the result of the optimization processing in the individual iterations by observation of the iteration results list.

The display of the optimization result at step S140 in FIG. 3 may be in other forms than the windows W1 to W4 exemplified in FIG. 5. Also, in this case, it is preferable to display the processing result to contain the correlation chart showing the values of the objective function and the constraint evaluation values with respect to each of the plurality of iterations, i.e., each of the plurality of candidate values of the control parameter on the display unit 350. In this manner, the worker may observe the display of the processing result and employ the appropriate candidate value of the result as the setting value of the control parameter.

At step S150, the worker determines whether or not to determine the setting value of the control parameter from the previous results of the optimization processing. For example, from the observation of the second window W2 shown in FIGS. 7 and 8, it is known that the five best solutions BS1 to BS5 and a plurality of feasible solutions are employable solutions. The worker can determine the setting value of the control parameter with reference to these solutions. For example, the worker clicks a set button BT1 with the best solution BS5 selected in FIG. 8, and then, the parameter setting section 311 employs the candidate value of the control parameter in the best solution BS5 as the setting value of the control parameter in response thereto. In this regard, the numeral in the low order digit is less important and rounding processing may be performed. Note that the determination at step S150 may be performed according to whether or not the target function and the constraint condition in the final candidate satisfy target specifications desired by the worker. The target specifications are e.g. a target lower limit of the average velocity as the target function and a target upper limit of the overshoot amount as the constraint evaluation value.

When the worker determines the setting value of the control parameter, the processing in FIG. 3 ends. On the other hand, when the setting value of the control parameter is indeterminable from the previous optimization processing results, the process goes to step S160. At step S160, the worker changes the constraint condition, and then, the parameter search unit 314 receives the change. The constraint condition may be individually set with respect to each motion for evaluation. For example, from the observation of the third window W3 shown in FIG. 9, it may be understood that there are several solutions having the constraint evaluation values slightly larger than the upper limit in the second motion for evaluation M2. In this regard, the worker may increase the feasible solution or the best solution by changing the upper limit of the constraint evaluation value in the second motion for evaluation M2 without actually executing the iteration again.

Figure 11:
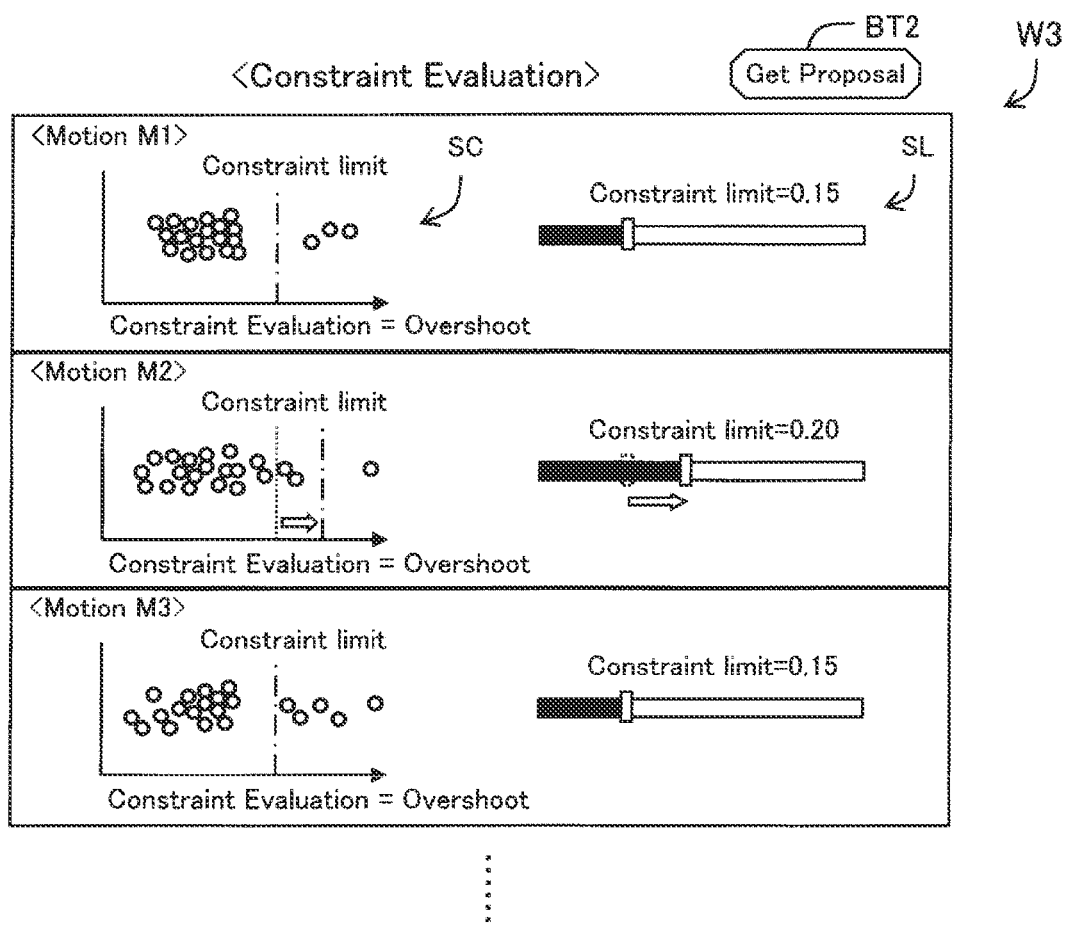
FIG. 11 is an explanatory diagram showing a change example of the constraint condition with respect to each motion for evaluation.

FIG. 11 is an explanatory diagram showing a change example of the constraint condition with respect to each motion for evaluation using the third window W3. In this example, in the second motion for evaluation M2, the upper limit of the constraint evaluation value is changed from 0.15 to 0.20 using the slider SL. Further, according to the change, in the strip chart SC of the constraint evaluation value, the position of the line showing the upper limit of the constraint evaluation value is changed.

When the constraint condition is changed, the process goes to step S170 in FIG. 3, and the parameter search unit 314 recalculates the processing result of the optimization processing according to the change of the constraint condition and presents the result to the worker. In the recalculation, part of the non-feasible solutions not satisfying the constraint condition of the previously obtained optimization processing results is changed to a feasible solution or a best solution without actual execution of an iteration.

Figure 12:
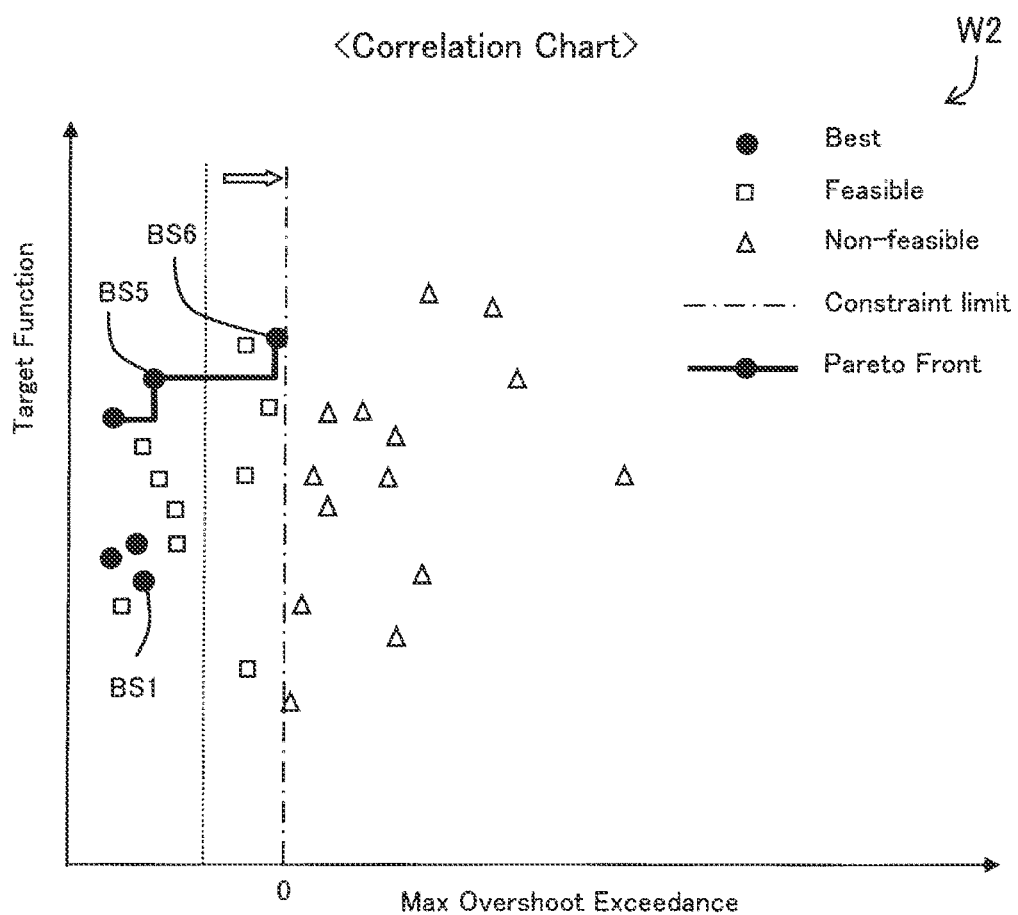
FIG. 12 is an explanatory diagram showing an example of changes of an optimization processing result due to changes of the constraint condition.

FIG. 12 is an explanatory diagram showing an example of changes of the optimization processing result according to changes of the constraint condition. In this example, in the correlation chart shown in the second window W2, the upper limit of the constraint evaluation value is changed from that in FIG. 7, the four non-feasible solutions are changed into feasible solutions according thereto, and the other non-feasible solution is changed to a best solution BS6. These additional feasible solutions and best solution BS6 may be used as candidates for determination of the setting value of the control parameter.

At step S180 in FIG. 3, like step S150, the worker determines whether or not to determine the setting value of the control parameter from the represented optimization processing result. When the setting value of the control parameter is determined, the processing in FIG. 3 ends. On the other hand, when the setting value of the control parameter is indeterminable, the process goes to step S190. Note that "when the setting value of the control parameter is indeterminable" refers to a case where there is no candidate value having the constraint evaluation value satisfying the constraint condition and the value of the objective function reaching the target value of the plurality of candidates of the control parameter.

At step S190, to execute the optimization processing at step S130 again, the parameter search unit 314 presents a change proposal of the constraint condition to the worker. The step S190 is started, for example, when the worker clicks a "Get Proposal" button BT2 in the third window W3 in FIG. 11. The change proposal of the constraint condition is created according to a change prediction of the search range, which will be described later.

Figure 13:
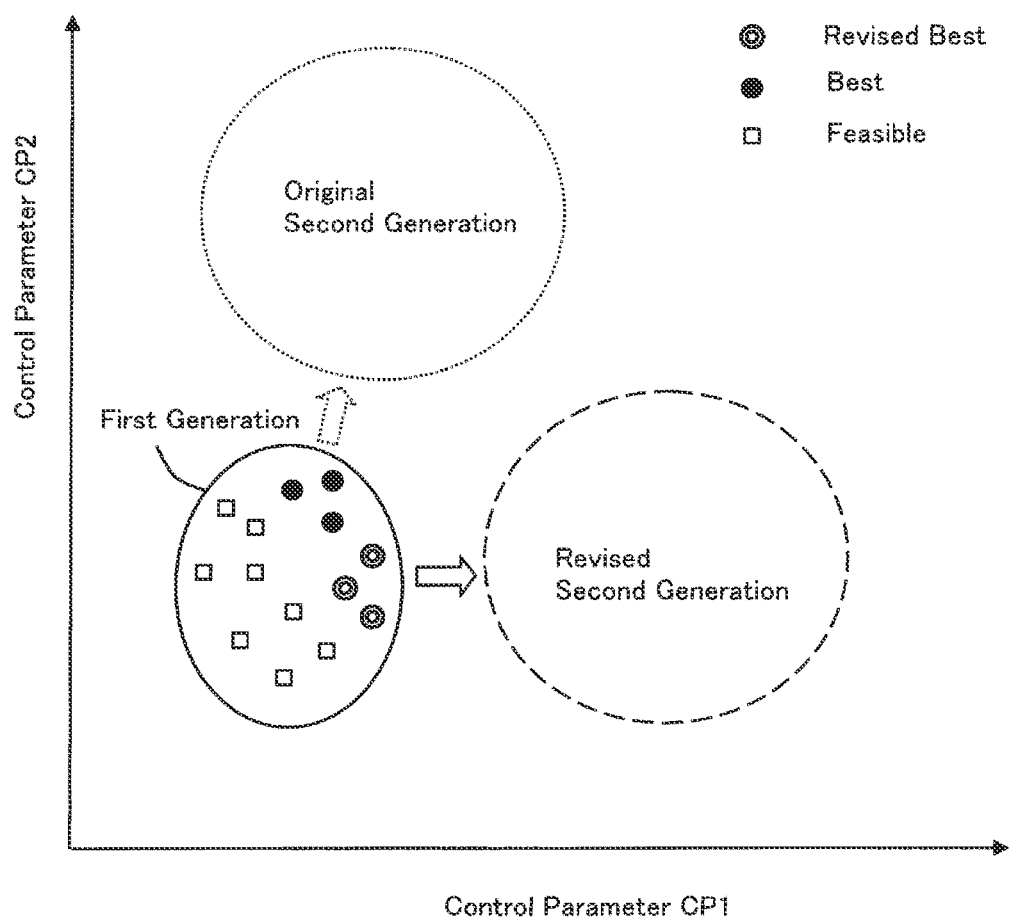
FIG. 13 is an explanatory diagram showing an example of changes of a search range due to changes of the constraint condition.

FIG. 13 is an explanatory diagram showing an example of changes of the search range due to changes of the constraint condition. The horizontal axis indicates a candidate value of a first control parameter and the vertical axis indicates a candidate value of a second control parameter. In the embodiment, an optimization algorithm based on a generation-based evolution strategy such as CMA-ES is used. In the optimization algorithm, of individuals generated in a certain generation, an individual generation distribution of the next generation is updated in a direction of individuals having higher goodness of fit. In the embodiment, "individual" is a candidate value of the control parameter, and "individual having high goodness of fit" is a solution satisfying the constraint condition and having a good objective function. In the following description, the individual having higher goodness of fit is simply referred to as "higher individual".

In FIG. 13, when the initially set constraint condition is applied, the higher individual in the search range of the first generation is expressed as "Best". Further, in the first generation, the constraint condition is changed and the optimization processing result is recalculated, and then, an individual expressed as "Revised Best" is added as a higher individual. The search range of the second generation is set in a direction in which there are many higher individuals in the first generation, and, when the constraint condition is changed, the search range of the second generation is also changed from "Original Second Generation" to "Revised Second Generation". Concurrently, the constraint condition is reset and the optimization processing at step S130 is executed again, and then, progress of searching to an unsearched area is predicted and a new solution can be obtained. Accordingly, at step S190, the parameter search unit 314 presents the change proposal of the constraint condition to the worker based on the prediction.

Figure 14:
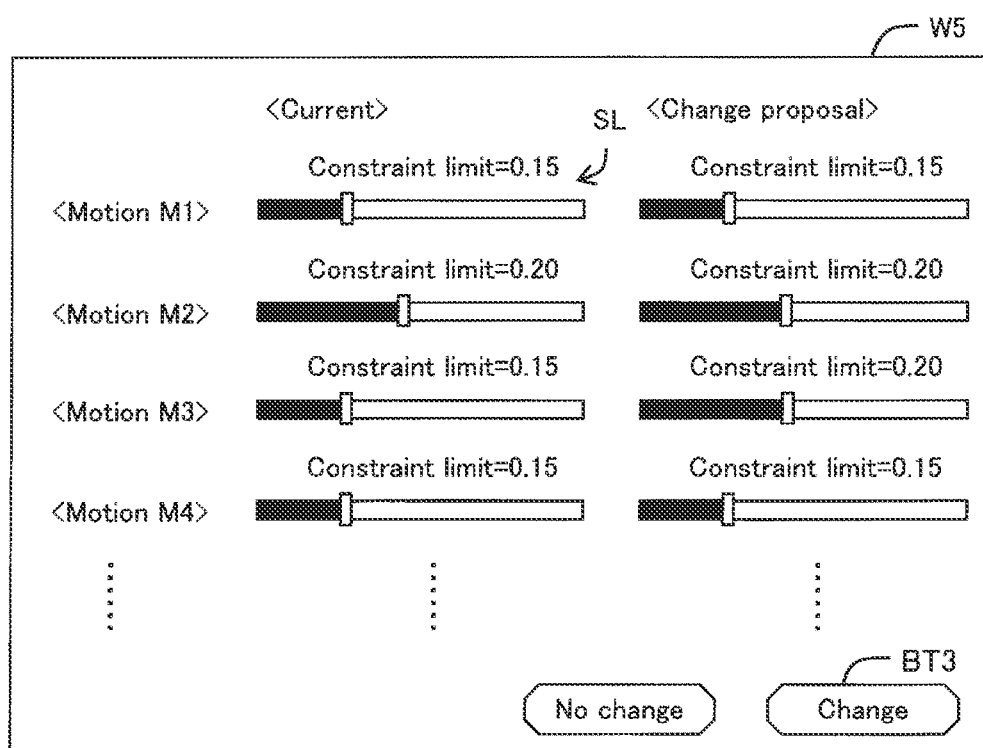
FIG. 14 is an explanatory diagram showing a proposal example of changes of the constraint condition.

FIG. 14 is an explanatory diagram showing an example of a window W5 for a change proposal of the constraint condition. Here, the present upper limits of the constraint evaluation values and the proposed upper limits of the constraint evaluation values are shown with respect to each motion for evaluation using the change operation portions in the forms of sliders SL. Specifically, regarding the motion for evaluation M3, a proposal that the upper limit of the constraint evaluation value is changed from 0.15 to 0.20 is presented. Note that, in the window W5, a comment "new solution may be obtained in change proposal" or the like may be displayed. Further, the change proposal can be further revised by the worker. On the other hand, if a new solution may be unobtainable even when the upper limit of the constraint evaluation value is changed, the change proposal as exemplified in FIG. 14 is not displayed, but, for example, a comment "only the same solution may be obtained if constraint condition is changed" or the like may be presented to the worker.

At step S200 in FIG. 3, the worker changes the constraint condition with reference to the proposal. For example, the worker clicks a change button BT3 provided in the window W5, then, the parameter search unit 314 receives the contents of the change proposal of the constraint condition, the process returns from step S200 to step S130, and the processing at step S130 and the subsequent steps is executed again. In this manner, the constraint condition is changed and the optimization processing of the control parameter is executed again, and thereby, a more appropriate solution can be obtained.

Note that the processing at steps S190, S200 can be executed at any time after the processing at steps S130 to S150 in FIG. 3 is executed once. For example, the processing at steps S190, S200 may be executed immediately after the processing at steps S130 to S150 is executed once or after the processing at steps S160 to S180 is executed twice or more.

Or, the above described step S190 may be omitted and, at step S200, for example, the worker may change the constraint condition using the third window shown in FIGS. 9 and 11, and the optimization processing at step S130 may be executed again. Note that the change proposal of the constraint condition is presented to the worker at step S190, and thereby, there is an advantage that the change of the constraint condition and the re-execution of the optimization processing may be started after the worker confirms the presented change proposal of the constraint condition.

As described above, in the embodiments, with respect to the plurality of candidate values used in the plurality of iterations of the control parameter, the processing result containing the correlation chart showing the values of the objective function and the constraint evaluation values is displayed, and thereby, an appropriate candidate value may be determined as the setting value of the control parameter according to the display of the processing result.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) A method of setting a control parameter of a robot is provided. The method includes (a) receiving settings of an objective function and a constraint condition used for optimization processing of the control parameter, (b) controlling the robot to execute work using a candidate value of the control parameter and measuring a performance index value for obtainment of the objective function and a constraint evaluation value relating to the constraint condition during the work, (c) searching for a next candidate value of the control parameter by executing the optimization processing using a value of the objective function obtained from the performance index value, (d) obtaining the values of the objective function and the constraint evaluation values with respect to the plurality of candidate values by repeating (b) and (c), and (e) displaying a processing result containing a correlation chart showing the values of the objective function and the constraint evaluation values with respect to each of the plurality of candidate values.

According to the method, with respect to the plurality of candidate values of the control parameter, the processing result containing the correlation chart showing the values of the objective function and the constraint evaluation values is displayed, and thereby, an appropriate candidate value may be determined as the setting value of the control parameter according to the display of the processing result.

(2) In the above described method, (e) may include (i) receiving a change of the constraint condition, and (ii) revising the processing result according to the change and redisplaying the revised processing result.

According to the method, a better candidate value can appear by the change of the constraint condition, and an appropriate control parameter may be set without re-execution of the work.

(3) In the above described method, the work may include a plurality of motions, and the change of the constraint condition is executed with respect to at least one motion selected from the plurality of motions.

According to the method, the constraint conditions may be changed with respect to each of the plurality of motions forming the work and, even when the constraint condition is not satisfied with respect to only a specific motion, the state may be resolved.

(4) In the above described method, (i) may include displaying a graph showing a relationship between a history of the constraint evaluation value and a limit value of the constraint evaluation value with respect to each motion of the plurality of motions and a change operation portion for changing the limit value with respect to each motion, and receiving the change of the constraint condition with respect to the at least one motion in response to an operation using the change operation portion.

According to the method, the graph showing the relationship between the history of the constraint evaluation value and the limit value of the constraint evaluation value and the change operation portion for changing the limit value with respect to each motion are displayed, and the worker may easily change the limit value of the constraint evaluation value with respect to each motion.

(5) The above described method may further include changing the constraint condition of the optimization processing and executing (b) to (e) again.

According to the method, the constraint condition may be changed and the optimization processing of the control parameter may be executed again.

(6) The above described method may further include displaying a change proposal of the constraint condition before changing the constraint condition of the optimization processing, and receiving an instruction on the change proposal and executing the change of the constraint condition according to the instruction.

According to the method, the worker may start the change of the constraint condition and the re-execution of the optimization processing after confirming the presented change proposal of the constraint condition.

(7) According to a second aspect of the present disclosure, a robot system is provided. The robot system includes a robot, sensors detecting a specific performance index value and a specific constraint evaluation value in work by control of the robot, and a parameter setting section executing processing of setting a control parameter of the robot. The parameter setting section executes (a) processing of receiving settings of an objective function and a constraint condition used for optimization processing of the control parameter, (b) processing of controlling the robot to execute work using a candidate value of the control parameter and measuring the performance index value for obtainment of the objective function and the constraint evaluation value relating to the constraint condition during the work, (c) processing of searching for a next candidate value of the control parameter by executing the optimization processing using a value of the objective function obtained from the performance index value, (d) processing of obtaining the values of the objective function and the constraint evaluation values with respect to the plurality of candidate values by repeating the processing (b) and the processing (c), and (e) processing of displaying a processing result containing a correlation chart showing the values of the objective function and the constraint evaluation values with respect to each of the plurality of candidate values.

(8) According to a third aspect of the present disclosure, a non-transitory computer-readable storage medium storing a computer program for controlling a processor to execute processing of setting a force control parameter in work of a robot is provided. The non-transitory computer-readable storage medium stores the computer program for controlling the processor to execute (a) processing of receiving settings of an objective function and a constraint condition used for optimization processing of the control parameter, (b) processing of controlling the robot to execute work using a candidate value of the control parameter and measuring a performance index value for obtainment of the objective function and a constraint evaluation value relating to the constraint condition during the work, (c) processing of searching for a next candidate value of the control parameter by executing the optimization processing using a value of the objective function obtained from the performance index value, (d) processing of obtaining the values of the objective function and the constraint evaluation values with respect to the plurality of candidate values by repeating the processing (b) and the processing (c), and (e) processing of displaying a processing result containing a correlation chart showing the values of the objective function and the constraint evaluation values with respect to each of the plurality of candidate values.

The present disclosure can be realized in various other aspects than those described above. For example, the present disclosure may be realized in aspects such as a robot system including a robot and a robot control apparatus, a computer program for realizing functions of the robot control apparatus, a non-transitory storage medium recording the computer program.

What is claimed is:
1. A method of setting a control parameter of a robot, comprising:
(a) receiving settings of an objective function and a constraint condition used for optimization processing of the control parameter;
(b) controlling the robot to execute work using a candidate value of the control parameter and measuring a performance index value for obtainment of the objec- tive function and a constraint evaluation value relating to the constraint condition during the work;

(c) searching for a next candidate value of the control parameter by executing the optimization processing using a value of the objective function obtained from the performance index value;

(d) obtaining the values of the objective function and the constraint evaluation values with respect to the plurality of candidate values by repeating (b) and (c); and (e) displaying a processing result containing a correlation chart showing the values of the objective function and the constraint evaluation values with respect to each of the plurality of candidate values;

wherein (e) includes:
   (i) receiving a change of the constraint condition; and
   (ii) revising the processing result according to the change and redisplaying the revised processing result;

wherein the work includes a plurality of motions, and the change of the constraint condition is executed with respect to at least one motion selected from the plurality of motions; and wherein (i) includes:
   displaying a graph showing a relationship between a history of the constraint evaluation value and a limit value of the constraint evaluation value with respect to each motion of the plurality of motions and a change operation interface for changing the limit value with respect to each motion; and
   receiving the change of the constraint condition with respect to the at least one motion in response to an operation using the change operation interface.

2. A robot system comprising:

a robot;

sensors detecting information relating to a performance index value and a constraint evaluation value in work by control of the robot;

a memory configured to store a program; and a processor configured to execute the program so as to:
   (a) receive settings of an objective function and a constraint condition used for optimization processing of a control parameter of the robot;
   (b) control the robot to execute the work using a candidate value of the control parameter and measure the performance index value for obtainment of the objective function and the constraint evaluation value relating to the constraint condition during the work;
   (c) search a next candidate value of the control parameter by executing the optimization processing using a value of the objective function obtained from the performance index value;
   (d) obtain the values of the objective function and the constraint evaluation values with respect to the plurality of candidate values by repeating (b) and (c);
   (e) display a processing result containing a correlation chart showing the values of the objective function and the constraint evaluation values with respect to each of the plurality of candidate values;
   (f) change the constraint condition of the optimization processing and execute (b) to (e) again;
   (g) display a change proposal of the constraint condition before changing the constraint condition of the optimization processing; and
   (h) receive an instruction on the change proposal and execute the changing of the constraint condition according to the instruction.

3. A non-transitory computer-readable storage medium storing a computer program for causing a computer to execute a process by a processor so as to perform the steps of:

(a) processing of receiving settings of an objective function and a constraint condition used for optimization processing of a control parameter of a robot;

(b) processing of controlling the robot to execute work using a candidate value of the control parameter and measuring a performance index value for obtainment of the objective function and a constraint evaluation value relating to the constraint condition during the work;

(c) processing of searching for a next candidate value of the control parameter by executing the optimization processing using a value of the objective function obtained from the performance index value;

(d) processing of obtaining the values of the objective function and the constraint evaluation values with respect to the plurality of candidate values by repeating (b) and (c);

(e) processing of displaying a processing result containing a correlation chart showing the values of the objective function and the constraint evaluation values with respect to each of the plurality of candidate values;

(f) changing the constraint condition of the optimization processing and executing (b) to (e) again;

(g) displaying a change proposal of the constraint condition before changing the constraint condition of the optimization processing; and (h) receiving an instruction on the change proposal and executing the changing of the constraint condition according to the instruction.

* * * * *